June 1, 1926.
W. W. BLAKELY
1,586,773
ANCHORAGE DEVICE FOR VEHICLES
Filed Nov. 10, 1924
2 Sheets-Sheet 1
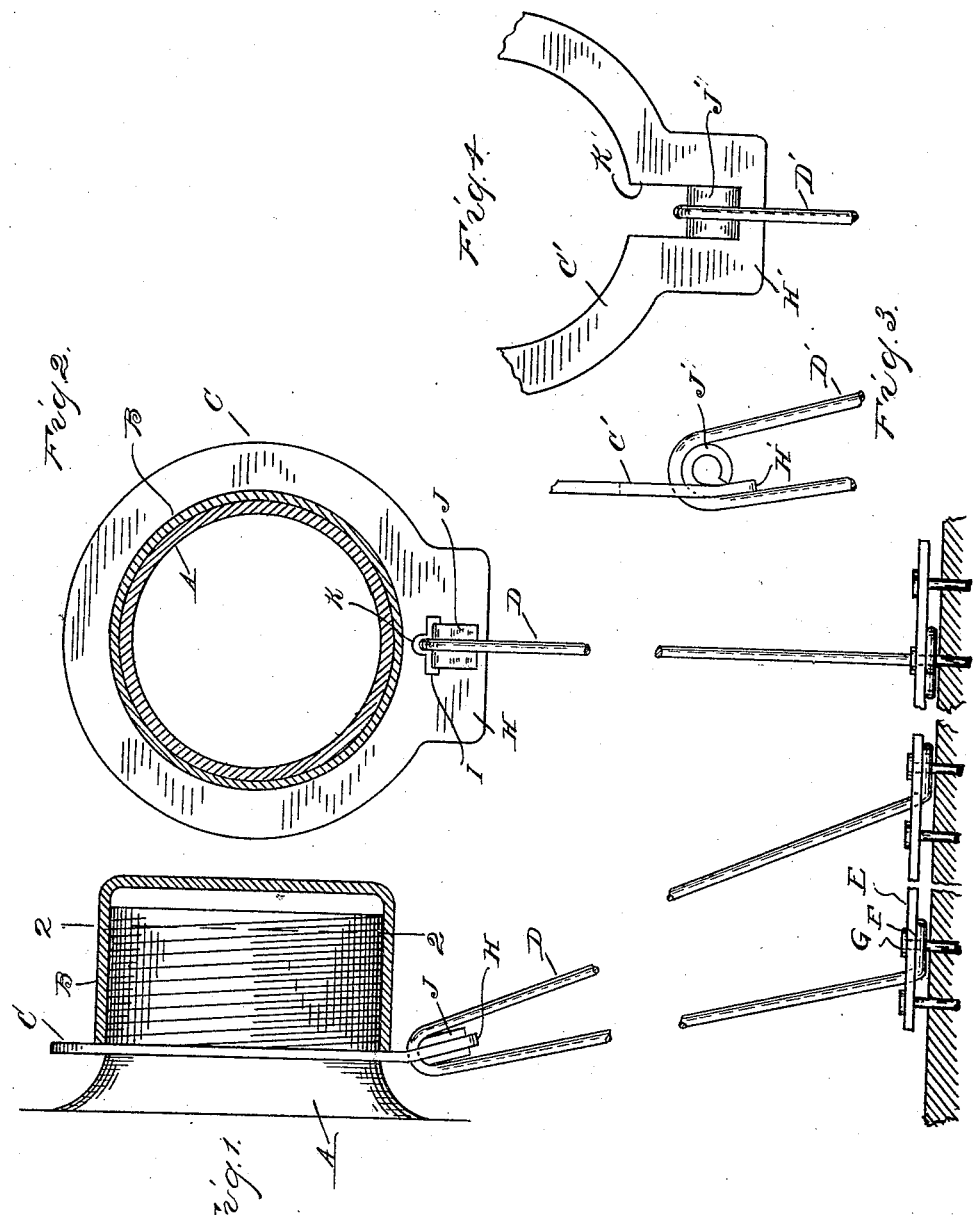
Inventor
William W. Blakely
By Whittemore Hulbert Whittemore
 Belknap   Attorneys

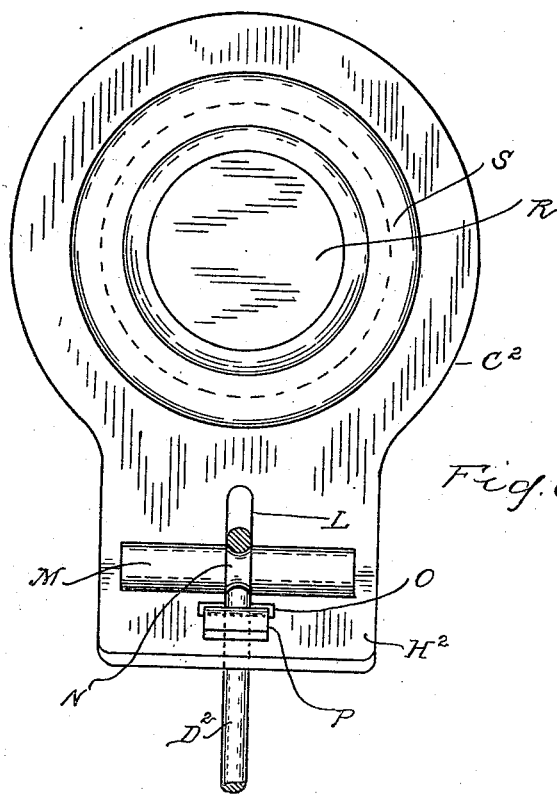
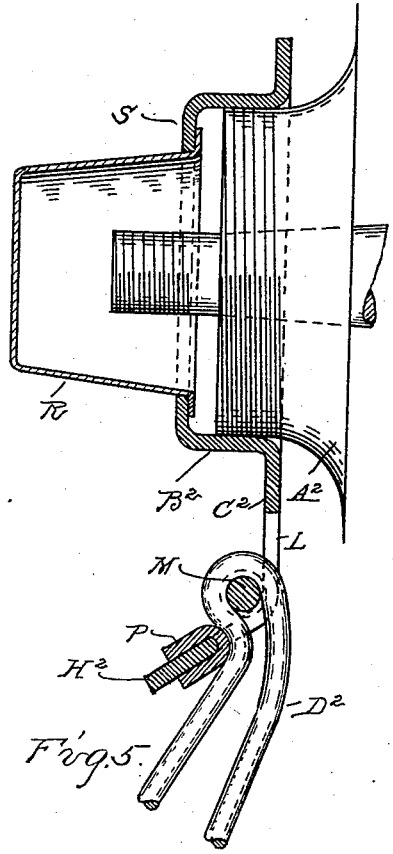
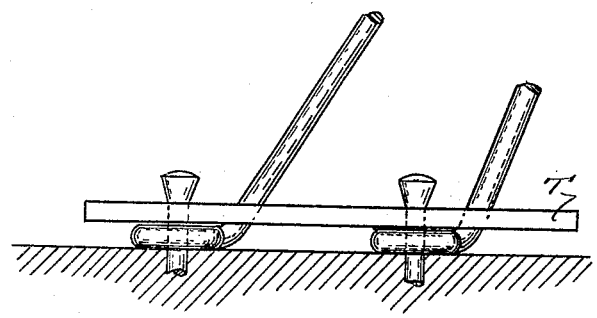

Patented June 1, 1926.

1,586,773

UNITED STATES PATENT OFFICE.

WILLIAM W. BLAKELY, OF DEXTER, MICHIGAN.

ANCHORAGE DEVICE FOR VEHICLES.

Application filed November 10, 1924. Serial No. 749,066.

This invention relates to anchorage devices for vehicles such as are employed to hold a vehicle stationary while undergoing shipment in a freight car or other carrier.

The invention consists in the structural features and arrangement of parts hereinafter set forth.

In the drawings:

Figure 1 is a view of the improved anchorage device in side elevation, showing the hub portion of a vehicle wheel engaged by said device;

Figure 2 is a section on line 2—2 of Figure 1.

Figure 3 is a fragmentary side elevation of a slight modification of the structures shown in Figures 1 and 2.

Figure 4 is an end view of the construction shown in Figure 3.

Figure 5 is view similar to Figure 1 but showing a further modification.

Figure 6 is an end view of the same.

In these views the reference character A designates the hub of a motor vehicle wheel, the same being exteriorly threaded as is common practice for engagement by a detachable cap B. The present invention utilizes the cap B to hold in place upon said hub a ring C preferably formed as a sheet metal stamping, the opening of said ring being threaded to engage the screw threads of the hub. D is a return-bent tie wire, which at its return-bend is engaged with the ring C beneath the hub A, said member forming legs at each side of the return-bend, which extend downwardly at a slight divergence, passing through a securing plate E and being bent to form looped feet F beneath said plate. Said plate clamps the feet F against a freight car floor or other surface, the plate being fastened to said floor by nails G or other suitable fastenings, certain of which fastenings are passed through the loops formed by said feet.

To adapt it for engagement by the tie connection D it is preferred to form the ring C with an integral downward projection H which is bent at a slight angle relative to the main body of said ring, said angle corresponding to that at which the tie member D extends from said ring. In said projection there is formed a slot I through which is passed a sheet metal strip J which is bent to an inverted U-shape to form a saddle upon which rests the bend of the tie wire D. Preferably the slot I has a central upward extension K to accommodate the bend of the tie wire.

In the construction shown in Figures 3 and 4 there is employed a ring C′ having a depending projection H′ and engageable by a return-bent tie member D′, all as have been already described, except that a saddle member for engagement by the return-bend of the tie wire D′ is in this modification formed by a tongue J′ which is sheared outwardly from the projection H′ leaving a slot K′ in the latter, said tongue being left integral at its lower end with said projection and being fashioned to a cylindrical form. The return-bend of the tie wire D′ passes through the slot K′ and seats upon the annulus J′.

In that alternative structure shown by Figures 5 and 6, the hub $A^2$ of a vehicle wheel is engaged by a cupped, interiorly threaded portion $B^2$ of a sheet-metal ring $C^2$. The latter has a downward extension $H^2$ engaged by a tie member $D^2$, similar to those already described, except that the top portion or arch of said member projects upwardly through a vertical slot L in the extension, and is engaged above the extension by a pin M, passing through said arch and having an annular groove N, in which the tie member seats. The lower end of the slot L has a horizontal extension O accommodating a saddle piece P.

R is a temporary dust-cap employed during shipment of the anchored vehicle, said cap being formed of paper or some other inexpensive material and being flanged outwardly to engage an inward flange S on the member $B^2$.

In removing the tie member $D^2$ from the adapter plate the anchorage plate T may be slid upwardly on said tie member to expand the arch of the latter and permit removal of the pin M. If a tire deflates the tie member may push up through the slot L.

In any of the described forms of the invention, the latter comprises exceedingly simple and inexpensive parts, consisting of sheet metal stampings and wire tie members. Furthermore, the device is one that may be very quickly applied to a vehicle and which employs a removable element of the vehicle itself to hold the attaching ring in place, said element being the hub cap B.

What I claim as my invention is:

1. In an anchorage device, the combination with a tie member, of a ring secured thereto having a cup-shaped portion, the base of said cup-shaped portion having an opening therein, and a separate closure for said opening.

2. In an anchorage device, the combination with a tie member having a return bent portion, of a ring having a depending lug provided with a slot receiving the return bent portion of the tie member.

3. In an anchorage device, the combination with a return bent tie member, of a ring having a slot receiving the return bend of the tie member.

4. In an anchorage device, the combination with a ring having a slot therein, a tie member extending through the slot, and a saddle for the tie member straddling an edge of said slot.

5. In an anchorage device, the combination with a ring, of a projection on the ring having a slot, a tie member extending through the slot, and a saddle for the tie member carried by the projection at an edge of the slot.

In testimony whereof I affix my signature.

WILLIAM W. BLAKELY.